United States Patent
Kim et al.

(10) Patent No.: US 7,244,791 B2
(45) Date of Patent: Jul. 17, 2007

(54) METHOD FOR PREPARING SULFONATED POLYSTYRENE FOR POLYMER ELECTROLYTE OF FUEL CELL

(75) Inventors: Hyoung-Juhn Kim, Suwon-Si (KR);
Ho-Jin Kweon, Suwon-Si (KR);
Yeong-Chan Eun, Suwon-Si (KR);
Sung-Yong Cho, Suwon-Si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 135 days.

(21) Appl. No.: 10/973,348

(22) Filed: Oct. 27, 2004

(65) Prior Publication Data

US 2005/0113530 A1 May 26, 2005

(30) Foreign Application Priority Data

Oct. 31, 2003 (KR) ............. 10-2003-0076909

(51) Int. Cl.
*C08L 51/00* (2006.01)
*C08F 8/00* (2006.01)
*C08F 8/36* (2006.01)

(52) U.S. Cl. ................... 525/333.3; 525/329.7

(58) Field of Classification Search ........... 525/333.3, 525/329.7
See application file for complete search history.

(56) References Cited

U.S. PATENT DOCUMENTS 5,679,482 A 10/1997 Ehrenberg et al.

6,605,391 B2 8/2003 Chen et al.

FOREIGN PATENT DOCUMENTS

| CN | 1178221 | 4/1998 |
|---|---|---|
| JP | H02-094261 | 4/1990 |
| JP | 09-102322 | 4/1997 |
| JP | 0818474 | * 1/1998 |

OTHER PUBLICATIONS

Kinouchi et al, Inexpensive and durable polyelectrolyte compositions, Japanese Patent, Jun. 2003, Chem Abstract 139: 22835.*

(Continued)

*Primary Examiner*—Duc Truong
(74) *Attorney, Agent, or Firm*—Robert E. Bushnell, Esq.

(57) ABSTRACT

A method for preparing sulfonated polystyrene, whereby a styrene monomer having a sulfonyl chloride is prepared by reacting p-styrene sulfonic acid salt with a chloride, a styrene-based polymer having the sulfonyl chloride is synthesized by the polymerization of a p-styrene sulfonyl chloride monomer and optionally at least one monomer of a styrene and an acrylic monomer, the styrene-based polymer having the sulfonyl chloride is treated with an inorganic base aqueous solution to change the sulfonyl chloride into a $SO_3M$ group where M is an alkali metal, and treated with an acidic aqueous solution to prepare a styrene-based polymer having a sulfonic acid group. The styrene-based polymer having the sulfonic acid group prepared according to the process of the present invention has high proton conductivity and good mechanical properties.

15 Claims, 1 Drawing Sheet

OTHER PUBLICATIONS

Kaneko et al, Solid polymer—gas sealing, Sanyo Electric Co., Ltd., Japan, Mar. 2003, Chem Abstract 138: 240635.*

Ding et al, Aself-organized network—polymer filme, Chemistry of Materials (2001), 13(7), 2231-2233; Chem Abstract 135: 195874.*

Wanatabe et al; Solid polymer electrolyte composition for fuel cells; Tanaka Kkinzoku Kogyo K.K.., Japan, Chem Abstract 129: 83769.*

Okuyama et al; Oxidation—for PEFC; Nippon Kagaku kaishi (1997), (1), 69-72, Chem Abstrcat 126: 120004.*

Okuyama et al; Characterization—in fuel cells; Nippon Kagaku Kaishi (1996), (9), 830-834; Chem Abstract 125: 226473.*

Okuyama et al; Ion Exchange—for fule cells; Asahi Chemical Ind, japan, 1995; Chem Abstract 122: 295354.*

* cited by examiner

METHOD FOR PREPARING SULFONATED POLYSTYRENE FOR POLYMER ELECTROLYTE OF FUEL CELL

CLAIM OF PRIORITY

This application claims all benefits accruing under 35 U.S.C. §119 from the Korean patent application No. 2003-76909 filed in the Korean Intellectual Property Office on Oct. 31, 2003, the disclosure of which is incorporated herein by reference.

BACKGROUND OF THE INVENTION

1. Field of the Invention

The present invention relates to a method for preparing sulfonated polystyrene for a polymer electrolyte for a fuel cell, and more particularly, to a method for preparing sulfonated polystyrene having good proton conductivity, a sulfonated polystyrene polymer electrolyte prepared according to the method, and a fuel cell comprising the sulfonated polystyrene polymer electrolyte.

2. Description of the Related Art

Fuel cells as electrochemical cells convert energy that is generated by an oxidation reaction of fuel to electrical energy. On an anode of a fuel cell, organic fuel such as methanol, formaldehyde, or formic acid is oxidized to carbon dioxide, and on a cathode, air or oxygen is reduced to water. A high specific energy of organic fuel renders the fuel cell more attractive. For example, the specific energy of methanol is 6232 wh/kg.

Fuel cells comprise a membrane electrode assembly (MEA) including an anode layer, a cathode layer, and a polymer electrolyte membrane (PEM) that is interposed between the two electrode layers and plays a role as a proton transfer medium. As the conductive polymer electrolyte of a fuel cell, a fluorine-containing polymer electrolyte membrane such as a perfluoro carbon sulfonic acid membrane (Nafion™ manufactured by DuPont Company) has chemical stability, high ionic conductivity and good mechanical properties, and is generally used.

However, a fluorine-containing polymer electrolyte has a disadvantage in that it is prepared by a complicated process, and has a high manufacturing cost. Further, since a fluorine-containing polymer electrolyte has a heat-resistance limit of less than 100° C., a cooling system for reforming gas and a removing system for carbon monoxide are needed when it is used as a power source for an automobile, a commercial small-sized power plant, or a portable power plant. The proton conductivity deteriorates and infiltration of methanol occurs at a high temperature of more than 80° C. or under low humidity of less than 60%.

Therefore, a sulfonated polymer such as sulfonated polyimide, polystyrene, polyphenylene, or polyetheretherketone (PEEK) has been researched as a polymer electrolyte membrane to replace fluorine-containing polymer electrolyte membranes. The sulfonated polystyrene is prepared through post-sulfonation of polystyrene. For example, Dais Analytical Corp. developed a sulfonated styrene-ethylene/butylene-styrene triblock polymer as a polymer electrolyte. However, the post-sulfonation has a disadvantage in that it is difficult to control the degree of sulfonation and it is difficult to obtain a material having various structures.

Japanese Patent Laid-open No. 97-102322 discloses a sulfonated polystyrene-graft-ethylene tetrafluoroethylene (ETFE) polymer comprising a copolymer of a fluorocarbon-based vinyl monomer and a hydrocarbon-based vinyl monomer as a main chain, and a hydrocarbon chain having a sulfone group as a side chain. The ETFE polymer can be prepared at a low cost, has enough mechanical properties for a polymer electrolyte, and can be improved in terms of conductivity by introducing many sulfone groups. The main chain of the copolymer of a fluorocarbon-based vinyl monomer and a hydrocarbon-based vinyl monomer has high oxidation resistance properties, but the hydrocarbon side chain is easily oxidized and deteriorated. Therefore, the ETFE polymer has insufficient oxidation resistance and durability for a polymer electrolyte for a fuel cell.

SUMMARY OF THE INVENTION

It is an aspect of the present invention to provide a method for preparing sulfonated polystyrene for a polymer electrolyte for a fuel cell, having good proton conductivity.

It is another aspect of the present invention to provide a sulfonated polystyrene polymer electrolyte prepared according to the method, and a fuel cell comprising the sulfonated polystyrene polymer electrolyte.

To accomplish the above and other aspects of the present invention, the present invention provides a method for preparing sulfonated polystyrene for a polymer electrolyte for a fuel cell comprising preparing a styrene monomer having a sulfonyl chloride, synthesizing a styrene-based polymer having the sulfonyl chloride group by a polymerization of the styrene monomer and optionally at least one monomer selected from a styrene and an acrylic monomer, and changing the sulfonyl chloride group of the styrene-based polymer into a sulfonic acid group to prepare the sulfonated polystyrene.

The styrene monomer having the sulfonyl chloride is preferably prepared by reacting p-styrene sulfonic acid salt with a chloride. The step of changing the sulfonyl chloride group preferably comprises treating the styrene-based polymer having the sulfonyl chloride with an inorganic base aqueous solution to change the sulfonyl chloride into an $SO_3M$ group where M is an alkali metal, and reacting the styrene-based polymer having the $SO_3M$ group with an acidic aqueous solution to prepare the styrene-based polymer having the sulfonic acid group.

The present invention also provides a polymer electrolyte membrane containing the sulfonated polystyrene, a manufacturing method thereof, and a fuel cell having the polymer electrolyte membrane containing the sulfonated polystyrene.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawing, wherein.

DETAILED DESCRIPTION OF THE PREFERRED EMBODIMENTS

Figure 1:
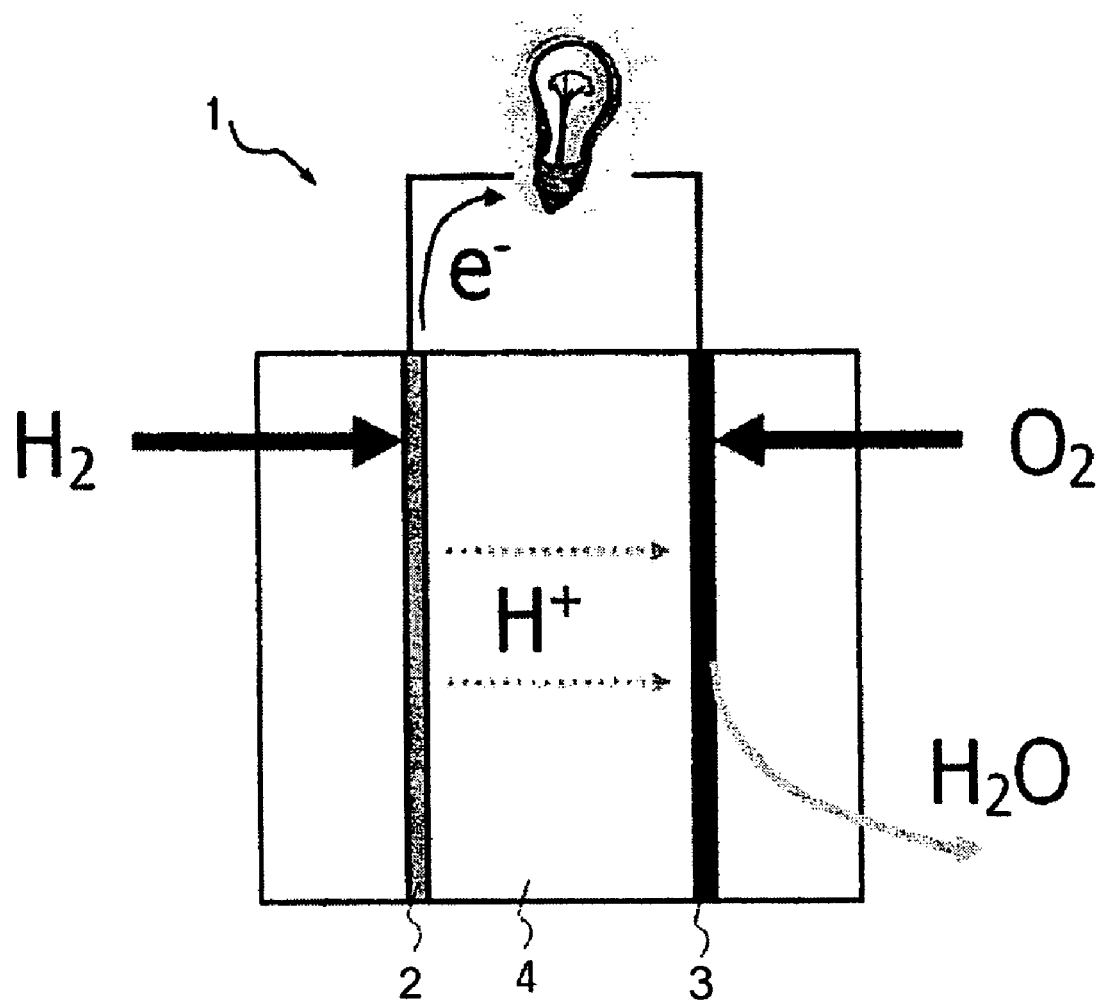
FIG. 1 is a systematic view of a fuel cell comprising a polymer electrolyte membrane.

In the following detailed description, only the preferred embodiments of the invention have been shown and described, simply by way of illustration of the best mode contemplated by the inventors of carrying out the invention. As will be realized, the invention is capable of modification in various obvious respects, all without departing from the invention. Accordingly, the drawing and description are to be regarded as illustrative in nature, and not restrictive.

In the present invention, a sulfonated polystyrene polymer as a polymer electrolyte membrane is prepared by using a styrene monomer having a sulfonyl chloride group to produce a styrene-based polymer having the sulfonyl chloride group and changing the sulfonyl chloride group into a sulfonic acid group.

The styrene monomer having the sulfonyl chloride group (i.e. a styrene sulfonyl chloride monomer) is prepared by reacting a p-styrene sulfonic acid salt with a chloride. The p-styrene sulfonic acid salt can be alkali metal salt such as sodium salt. The chloride includes thionyl chloride.

The styrene-based polymer can be prepared by polymerizing the styrene sulfonyl chloride monomer to prepare a homopolymer or polymerizing a styrene sulfonyl chloride monomer and at least one monomer such as styrene and an acrylic monomer to prepare a copolymer. The polymerization can be carried out by using a radical initiator such as an azo-based compound or a peroxide-based compound. The azo-based compound includes azobisisobutyronitrile, and the peroxide-based compound includes benzoyl peroxide, cumyl peroxide, t-butyl peroxide, and lauryl peroxide. A solvent for radical polymerization may be used. The solvent includes dimethylformamide, benzene, toluene, xylene, ethylbenzene, methylethylketone, etc. The polymer can be obtained by precipitating the synthesized polymer in a non-solvent (a solvent which cannot dissolve a polymer). The non-solvent includes alcohols such as methanol or ethanol, or a linear hydrocarbon such as hexane.

The polymer is treated with an inorganic base aqueous solution to introduce an $SO_3M$ group (where M is an alkali metal), followed by reacting an acidic aqueous solution to prepare a styrene-based polymer having a sulfonic acid group. The base aqueous solution includes an aqueous solution of an alkali metal hydroxide such as NaOH, KOH, etc., but is not limited thereto. The acidic aqueous solution includes a hydrochloric acid or a sulfuric acid aqueous solution.

The examples of the styrene-based copolymer having sulfonic acid group are represented by the following formulas 1 and 2:

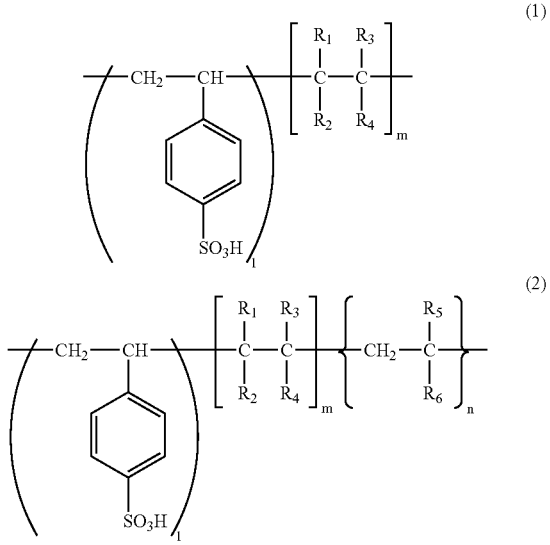

where $R_1$ to $R_5$ are independently hydrogen, halogen, alkyl, aryl, or halogenated aryl; $R_6$ is $CO_2R'$ where R' is hydrogen or alkyl; and l, m and n represent polymerization degrees.

In the present invention, alkyl is preferably a $C_1$ to $C_6$ hydrocarbon, and aryl is preferably a $C_6$ to $C_{12}$ hydrocarbon. More preferably, $R_1$ to $R_5$ are independently hydrogen, fluorine, methyl, phenyl or fluorophenyl. R' is preferably hydrogen or methyl. The ratio of l, m and n can be considered as the mole ratio of the groups for l, m and n. The ratio of l (i.e., $l/(l+m+n)$) is preferably 30 to 70%, more preferably 30 to 50%, the ratio of m (i.e., $m/(l+m+n)$) is preferably 30 to 70%, and the ratio of n (i.e., $n/(l+m+n)$) is preferably 10 to 20%. When l is within the above range, i.e. 30 to 70%, the polymer does not dissolve in water and has good proton conductivity.

Preferable polymers include a polymer having the formula 1 where $R_1$ to $R_3$ are hydrogen or fluorine, $R_4$ is a phenyl, or where $R_1$ and $R_2$ are hydrogen, $R_3$ is methyl and $R_4$ is phenyl; a polymer having the formula 2 where $R_1$ to $R_3$ are hydrogen or fluorine, $R_4$ is phenyl, $R_5$ is hydrogen or methyl and $R_6$ is $CO_2H$ or $CO_2CH_3$, or where $R_1$ and $R_2$ are hydrogen, $R_3$ is methyl, $R_4$ is phenyl, $R_5$ is hydrogen or methyl, and $R_6$ is $CO_2H$ or $CO_2CH_3$.

FIG. 1 is a systematic view of a polymer electrolyte membrane fuel cell (PEFC). A PEFC 1 comprises a membrane electrode assembly (MEA) including an anode layer 2, a cathode layer 3, and a polymer electrolyte membrane (PEM) 4, which is interposed between the anode layer 2 and the cathode layer 3. The fuel cell generates electric power by electrochemical reaction between the anode and cathode which are provided with hydrogen or fuel. Protons generated in the anode 2 are transferred to the cathode 3 through the polymer electrolyte membrane 4. The styrene-based polymer having a sulfonic acid group prepared according to the process of the present invention has high proton conductivity and good mechanical properties, and therefore can be used as a polymer electrolyte membrane for a fuel cell.

The following examples further illustrate the present invention in detail, but are not to be construed to limit the scope thereof.

EXAMPLE 1

1-1 Synthesis of p-styrene Sulfonyl Chloride

A mixture containing 50 ml of anhydrous dimethylformamide and 40 ml of thionyl chloride was placed in an ice bath, and 15 g of p-styrene sulfonic acid sodium salt was slowly added thereto for 30 minutes while agitating. The mixture was further agitated for 1 hour to obtain a homogenous solution. The solution was placed in a refrigerator for 12 hours, and 300 g of ice pieces were slowly poured therein. The synthesized organic material was extracted in benzene without thiophene, washed with water, and dried using anhydrous $Na_2SO_4$. Then benzene was removed with a vacuum pump at room temperature, resulting in a yellow liquid (13 g). The resultant product was identified by $^1$H-NMR.

$^1$H-NMR (CDCl$_3$) d7.78 (d, 2H, ArH, $J_3$=8.0 Hz), 7.60 (d, 2H, ArH, $J_3$=8.0 Hz), 6.77 (dd, 1H, =CH,$j_3$=20.0 Hz, $J_3$=12.0 Hz), 5.96 (d, 1H, =CH, $J_3$=20.0 Hz), 5.54 (d, 1H, =CH, $J_3$=12.0 Hz).

1-2 Synthesis of Poly(4-Styrene Sulfonyl Chloride)

1 g (4.9 mmol) of p-styrene sulfonyl chloride which was produced in the above process 1-1 and 35 mg (0.21 mmol) of α,α-azobisisobutyronitrile were dissolved in 1.5 ml of dimethylformamide, and air was removed therefrom using N₂ followed by sealing. The resultant solution was placed at a temperature of 70° C., and polymerization was carried out for 3 hours. The reaction mixture was cooled to room temperature and slowly poured into hexane to obtain a white precipitate. This precipitate was filtrated and dried in a vacuum oven to obtain 0.8 g of white powder.

1-3 Styrene-Based Polymer Electrolyte Membrane Having Sulfonic Acid (SO₃H) Group 1 g of the polymer, which was produced in the above process 1-2, was dissolved in 3 ml of tetrahydrofuran and then coated on glass using a doctor blade. Solvent was removed in a vacuum oven to prepare a polymer membrane. The polymer membrane was precipitated in 5% NaOH aqueous solution for 5 hours at 40° C. so that the polymer developed SO₃Na groups. Then, the SO₃Na groups were changed into SO₃H groups by precipitating in a 10% HCl aqueous solution for 24 hours at room temperature to obtain a styrene-based polymer electrolyte membrane having sulfonic acid groups (IR (KBr) cm⁻¹ 3400 (O—H), 2930 (C—H), 1175 (S=O)).

EXAMPLE 2

1 g (4.9 mmol) of p-styrene sulfonyl chloride which was produced in the above process 1-1 of EXAMPLE 1, 0.5 g (4.8 mmol) of styrene, and 35 mg (0.21 mmol) of α,α-azobisisobutyronitrile were dissolved in 1.5 ml of butanone, and air was removed using N₂ followed by sealing. The resultant solution was placed at a temperature of 70° C., and polymerization was carried out for 3 hours to obtain a 4-styrene sulfonyl chloride-styrene copolymer. The reaction mixture was cooled to room temperature and poured into methanol slowly to obtain a white precipitate. This precipitate was filtrated and dried in a vacuum oven to obtain 1.2 g of white powder. Using this product, a polymer electrolyte membrane was prepared according to the same method as in 1-3 of Example 1.

EXAMPLE 3

1 g (4.9 mmol) of p-styrene sulfonyl chloride which was produced in the above process 1-1 of EXAMPLE 1, 0.57 g (4.8 mmol) of α-methylstyrene, and 35 mg (0.21 mmol) of α,α-azobisisobutyronitrile were dissolved in 1.5 ml of butanone, and air was removed using N₂ followed by sealing. The resultant solution was placed at a temperature of 70° C., and polymerization was carried out for 3 hours to obtain a copolymer of 4-styrene sulfonyl chloride and α-methylstyrene. The reaction mixture was cooled to room temperature and poured into methanol slowly to obtain a white precipitate. This precipitate was filtrated and dried in a vacuum oven to obtain 1.3 g of white powder. Using this product, a polymer electrolyte membrane was prepared according to the same method as in 1-3 of EXAMPLE 1.

EXAMPLE 4

1 g (4.9 mmol) of p-styrene sulfonyl chloride which was produced in the above process 1-1 of EXAMPLE 1, 1 g (9.6 mmol) of styrene, 0.35 g (4.9 mmol) of acrylic acid, and 20 mg (0.12 mmol) of α,α-azobisisobutyronitrile were dissolved in 1.5 ml of butanone, and air was removed using N₂ followed by sealing. The resultant solution was placed at a temperature of 70° C., and polymerization was carried out for 3 hours to obtain a 4-styrene sulfonyl chloride-styrene-acrylic acid terpolymer (IR (KBr) cm⁻¹ 3400 (O—H), 2931 (C—H), 1707 (C=O), 1173 (S=O)). The reaction mixture was cooled to room temperature and poured into methanol slowly to obtain a white precipitate. This precipitate was filtrated and dried in a vacuum oven to obtain 1.9 g of white powder. Using this product, a polymer electrolyte membrane was prepared according to the same method as in 1-3 of EXAMPLE 1.

With respect to the polymer electrolyte membrane of the examples, the absorbed water content percentage was measured according to relative humidity.

TABLE 1

| Relative humidity (%) | Absorbed water content/100 mg of polymer (mg) |
|---|---|
| 90 | 54.8 |
| 75 | 33.7 |
| 50 | 24.3 |
| 35 | 19.0 |
| 15 | 12.8 |

As shown in TABLE 1, a polymer electrolyte membrane according to the present invention has a water absorption percentage of over 12% when the relative humidity is 15 to 90%.

In the present invention, sulfonated polystyrene can be prepared by using a monomer with sulfonyl chloride and therefore the monomer composition can be changed easily, and further various random or alternating polymers can be produced.

The styrene-based polymer having sulfonic acid groups prepared according to the process of the present invention has high proton conductivity and good mechanical properties, and can therefore be used as a polymer electrolyte membrane for a fuel cell.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method for preparing sulfonated polystyrene, comprising:
    preparing a styrene monomer having a sulfonyl chloride group;
    synthesizing a styrene-based polymer having the sulfonyl chloride group by a polymerization of the styrene monomer having the sulfonyl chloride group and optionally at least one monomer selected from the group consisting of a styrene and an acrylic monomer; and
    changing the sulfonyl chloride group of the styrene-based polymer into a sulfonic acid group to prepare the sulfonated polystyrene.

2. The method according to claim 1, wherein the step of preparing the styrene monomer having the sulfonyl chloride group comprises reacting a p-styrene sulfonic acid salt with a chloride to prepare p-styrene sulfonyl chloride.

3. The method according to claim 1, wherein the step of changing the sulfonyl chloride group comprises:
    treating the styrene-based polymer having the sulfonyl chloride with an inorganic base aqueous solution to change the sulfonyl chloride into a SO₃M group where M is alkali metal; and
    reacting the styrene-based polymer having the SO₃M group with an acidic aqueous solution to prepare the styrene-based polymer having the sulfonic acid group.

4. The method according to claim 2, wherein the styrene sulfonic acid salt is an alkali metal salt, and the chloride is thionyl chloride.

5. The method according to claim 1, wherein the polymerization is carried out by using a radical initiator.

6. The method according to claim 5, wherein the radical initiator is an azo-based compound or a peroxide-based compound.

7. The method according to claim 6, wherein the azo-based compound is azobisisobutyronitrile, and the peroxide-based compound is selected from the group consisting of benzoyl peroxide, cumyl peroxide, t-butyl peroxide, and lauryl peroxide.

8. The method according to claim 5, wherein the polymerization is carried out by using a solvent selected from the group consisting of dimethylformamide, benzene, toluene, xylene, ethylbenzene, and methylethylketone for radical polymerization.

9. The method according to claim 3, wherein the inorganic base aqueous solution is an aqueous solution of an alkali metal hydroxide, and the acidic aqueous solution is selected from the group consisting of a hydrochloric acid and a sulfuric acid aqueous solution.

10. The method according to claim 1, wherein the sulfonated polystyrene is represented by one of the formulae 1 and 2:

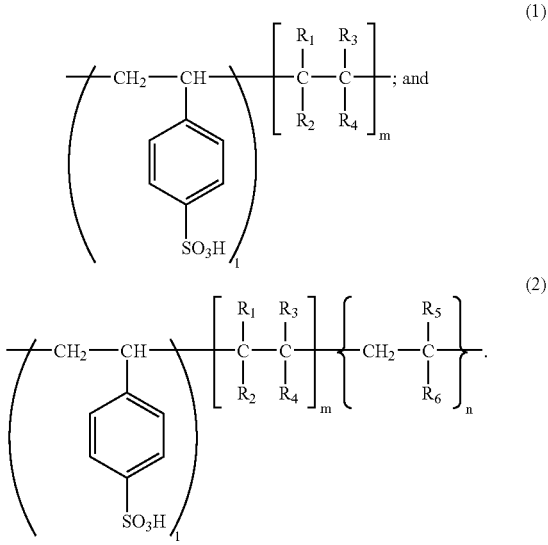

where $R_1$ to $R_5$ are independently hydrogen, halogen, alkyl, aryl, halogenated aryl, $R_6$ is $CO_2R'$ where R' is hydrogen or alkyl, and 1, m and n represent polymerization degrees.

11. The method according to claim 10, wherein the ratios of 1, m and n are 30 to 70%, 30 to 70%, and 10 to 20%, respectively.

12. A method for producing a sulfonated polystyrene electrolyte membrane, comprising:

polymerizing a styrene monomer having a sulfonyl chloride and optionally at least one monomer selected from the group consisting of a styrene and an acrylic monomer to synthesize the styrene-based polymer having the sulfonyl chloride group;

preparing a polymer solution containing the styrene-based polymer having the sulfonyl chloride group dissolved in a solvent;

coating a substrate with the polymer solution;

removing the solvent; and changing the sulfonyl chloride group of the styrene-based polymer into a sulfonic acid group to obtain the styrene-based polymer electrolyte membrane.

13. The method according to claim 12, wherein the step of changing the sulfonyl chloride group, comprises:

treating the styrene-based polymer having the sulfonyl chloride with an inorganic base aqueous solution to change the sulfonyl chloride into a SO3M group where M is alkali metal; and reacting the styrene-based polymer having the $SO_3M$ group with an acidic aqueous solution to prepare the styrene-based polymer having the sulfonic acid group.

14. The method of claim 12, wherein the sulfonated polystyrene electrolyte membrane comprises a polymer represented by Formula 1:

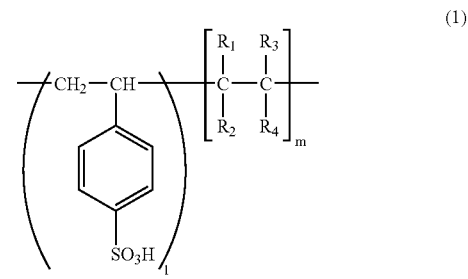

where $R_1$ to $R_4$ are independently hydrogen, halogen, alkyl, aryl, halogenated aryl.

15. The method of claim 12, wherein the sulfonated polystyrene electrolyte membrane comprises a polymer represented by Formula 2:

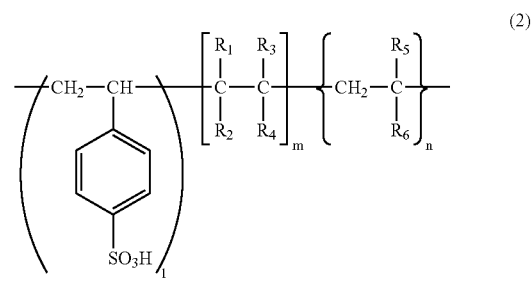

where $R_1$ to $R_5$ are independently hydrogen, halogen, alkyl, aryl, halogenated aryl, $R_6$ is $CO_2R'$ where R' is hydrogen or alkyl, and 1, m and n represent polymerization degrees.

* * * * *